United States Patent [19]

Zindler

[11] 4,119,379

[45] Oct. 10, 1978

[54] OPTICAL DETECTION AND RANGING APPARATUS

[75] Inventor: Jerrold Zindler, Cambridge, Mass.

[73] Assignee: Sanders Associates, Inc., Nashua, N.H.

[21] Appl. No.: 670,971

[22] Filed: Sep. 27, 1967

[51] Int. Cl.² .................... G01C 3/08; G01B 11/26
[52] U.S. Cl. ................................. 356/4; 356/5; 356/152
[58] Field of Search .................. 88/1 U; 350/6, 7; 178/6.8, 7.6; 356/4, 5, 152

[56] References Cited

U.S. PATENT DOCUMENTS

| | | | |
|---|---|---|---|
| 3,376,411 | 4/1968 | Montani et al. | 356/4 |
| 3,498,717 | 3/1970 | Kumagai | 356/5 |
| 3,527,533 | 9/1970 | Hook et al. | 356/5 |
| 3,546,375 | 12/1970 | Vitt, Jr. | 356/4 |

Primary Examiner—S. C. Buczinski
Attorney, Agent, or Firm—Louis Etlinger; Richard I. Seligman

[57] ABSTRACT

Optical detecting and ranging equipment of high information gathering and processing capacity employs a pulsed coherent source illuminating with each pulse a line field of view. An optical receiver monitoring the entire field of view has a scanner that causes reflections received at different times to be recorded at correspondingly different coordinates.

19 Claims, 1 Drawing Figure

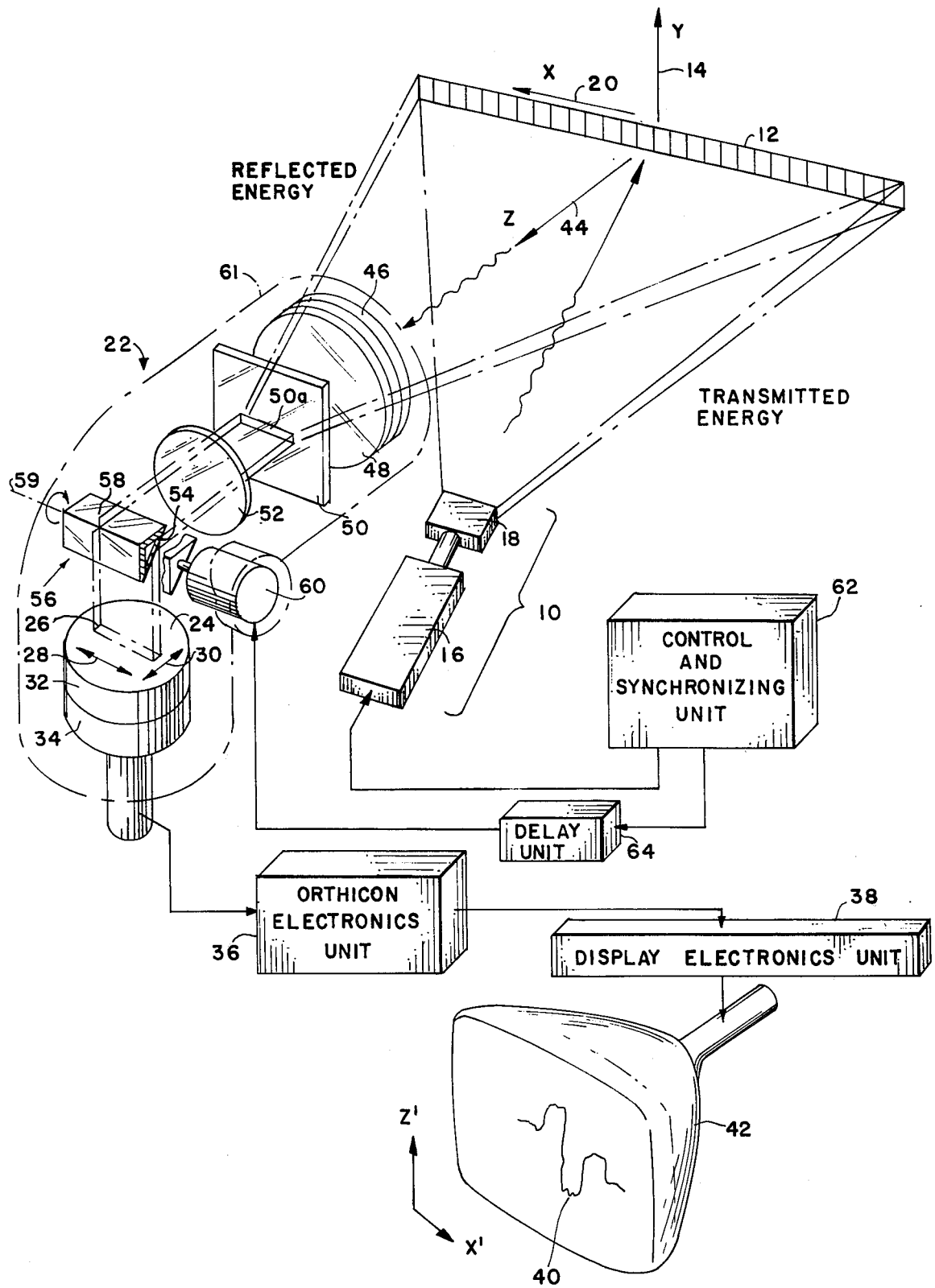

OPTICAL DETECTION AND RANGING APPARATUS

BACKGROUND OF THE INVENTION

This invention relates to an optical detection and ranging system. More particularly, it relates to an optical radar system capable of obtaining a relatively large amount of information with accurate range determination and high noise rejection. The system is relatively simple in operation and comparatively low in cost.

DESCRIPTION OF THE PRIOR ART

Common prior art optical detection and ranging apparatus examines the field of view on a sequential point-by-point basis with pulses of light generated by lasers. Because each pulse produces information from essentially only one point, this operation generally requires that pulses be transmitted, and reflections received and processed, at a high repetition rate. Consequently, relatively complex and wide-bandwidth information processing and storing apparatus is needed to combine and store, and otherwise process, the many individually-generated reflections.

Moreover, present day lasers capable of high repetition rates have relatively broad optical bandwidths. As a result, the receivers used in ranging systems employing such lasers must accept optical energy over a correspondingly broad band. This adversely affects signal-to-noise ratio because of the sensitivity to extraneous energy, particularly from the sun, within the passbands of the receivers.

It is an object of this invention to provide improved optical detection and ranging apparatus.

More particularly, it is an object to provide optical apparatus for obtaining spatially and chronologically arranged echo information from many points in a relatively short time and with relatively simple equipment. Further, it is an object to provide such apparatus capable of gathering and assembling a relatively large amount of information with operation at a relatively low pulse repetition rate.

Another object is to provide detection and ranging apparatus of the above character capable of producing range information of high accuracy.

A further object is to provide detection and ranging equipment of the above character characterized by narrow optical bandwidth.

Other objects of the invention will in part be obvious and will in part appear hereinafter.

The invention accordingly comprises the features of construction, combination of elements, and arrangement of parts exemplified in the construction hereinafter set forth, and the scope of the invention is indicated in the claims.

SUMMARY OF THE INVENTION

The present detecting and ranging system illuminates an entire narrow, elongated field of view with a single pulse of essentially coherent energy, suitably from a pulsed laser, and processes the reflections along the field resulting from this pulse. The system produces a line display in which each line segment results from a reflection from a corresponding segment of the elongated field of view. Thus the position of the segment along the displayed line identifies the corresponding segment of the field. As described below, the position of the line segment in the transverse direction of the display indicates the distance of the field segment.

With each pulse the system obtains reflection information regarding a relatively large number of points, i.e. the entire elongated field of view and, therefore, it generally can operate at a comparatively low pulse repetition rate. Specifically, the system needs only to transmit successive pulses, and receive and process reflections from them, at a relatively slow rate. Prior art point-by-point optical radar apparatus, on the other hand, requires a large succession of pulses, i.e. a high repetition rate, to produce a like amount of information. That is, the present system essentially views a "line" in space with each pulse, whereas in the point-by-point systems, each pulse provides a view of but one of many "points" on the line.

The low repetition rate requirement of the present equipment makes it possible to use optical sources selected primarily for narrow spectral line width. The result of using a pulse of narrow line width is that the receiver can have a correspondingly narrow response bandwidth and hence eliminate much undesirable solar background radiation and other noise.

Further, optical sources of limited repetition rate, which are generally suitable for use in the present equipment, are often capable of producing shorter duration pulses than the high repetition rate sources required in prior point-by-point optical radars. The use of such short-pulse optical sources facilitates making accurate range determinations. That is, the shorter the duration of the pulse that illuminates the field of view, the greater is the resolution in determination of the distance to a reflector of that pulse.

A further advantage of the invention results from the fact that the reflections received from successive segments of the field of view are received simultaneously (except for the spread due to different distances to the respective segments). They can therefore be readily stored in an image orthicon tube or similar device and then processed sequentially at a relatively slow rate by narrow bandwidth circuits. This should be contrasted with prior point-by-point systems which sequentially illuminate successive segments of the field at a high rate and then must process the incoming reflections sequentially at the same rate.

BRIEF DESCRIPTION OF THE DRAWING

For a fuller understanding of the nature and objects of the invention, reference should be had to the following detailed description taken in conjunction with the accompanying drawing, which shows optical radar equipment embodying the invention.

DESCRIPTION OF THE PREFERRED EMBODIMENT

Referring to the drawing, the optical radar system has an optical source 10 that simultaneously illuminates a substantially line field of view 12 with a single pulse of coherent optical energy. Although denominated as a line, the field of view has a finite transverse dimension along the illustrated Y axis 14. The source 10 includes a laser 16 and an optical system 18. The laser is operated to emit short duration pulses of essentially monochromatic and coherent light. The optical system 18 transforms the generally circular laser beam to a beam of rectangular cross-section that diverges substantially along its longitudinal dimension, illustrated as the X axis 20, along which the field of view 12 extends.

An optical receiver 22 senses reflections from the entire field of view 12 and projects them onto a surface 24 in the form of a line image 26 of the field of view 12. The receiver preserves the spatial structure of the reflections. As a result, reflected energy impinges on the surface 24 at coordinates along a first receiver axis 28 corresponding to the X-axis 20 position of the objects from which it is reflected.

Further, the receiver causes the line image 26 of the reflections to move relative to the surface 24 along a second receiver axis 30 transverse to the axis 28. This causes reflections arriving at different times to impinge on the surface 24 at correspondingly different coordinates along the axis 30.

With further reference to the drawing, the surface 24 is the input face of an image intensifier 32 disposed in front of an image orthicon 34. The orthicon, operated with a conventional orthicon electronics unit 36, converts the reflected optical energy imaged on the converter 32 to a sequence of electrical signals. A display electronics unit 38, also of conventional construction, displays these signals as a profile 40 on the screen of a cathode ray tube 42.

The profile 40 thus produced with a single pulse of energy from the source 10 charts the distance from the receiver 22, i.e. along the range or Z axis 44, of the respective reflecting objects along the line field of view 12. This distance is displayed on the cathode ray tube along the indicated Z' axis. Longitudinal position along the field of view, i.e. along the X axis 20, is displayed on the cathode ray tube along the X' axis.

More specifically, the illustrated receiver 22 has, in successive optical alignment with reflections from the field of view 12, a spectral filter 46, an objective lens 48, an aperture plate 50 at the focal plane of the lens 48, a relay lens 52, and a mirror 54 that is part of an optical scanner 56. The filter 46 has a narrow optical bandwidth corresponding to that of the laser 16. At its focal plane the objective lens 48 forms an image of the optical energy passing through the filter 46; a slot 50a in the plate 50 limits the receiver field of view to the illuminated field 12. The relay lens 52 converges the image at the aperture plate slit 50a into a line on the image intensifier surface 24.

The scanning mirror 54 is angled relative to the optical path of the reflections from the lens 52 so as to reflect them onto the surface 24. The length and height of the mirror are sufficient to transfer reflections from the entire field of view 12 to the surface 24.

The scanning mirror 54 which alternatively can be a Dove prism, is mounted in a carriage 58 rotatable about an axis 59 transverse to the optical path from the lens 52 to the mirror. A scanner drive mechanism 60, such as a precision motor, is coupled to the carriage 58 to rotate it and the mirror about this rotation axis. In particular, the drive mechanism 60 spins the mirror at a high rate to sweep the line image 26 across the surface 24, in the direction of the transverse axis 30, for each pulse emitted from the source 10.

An optically-shielding housing indicated schematically at 61 supports the receiver elements 46–60 and the image converter 32 and orthicon 34.

The scanner 56 moves the line image 26 across the image plane 24 at a rate determined by the complete range interval to be examined. For example, to examine objects in the field of view having a range interval R of 1000 meters, the total sweep time, T, is $$T = \frac{2R}{c} = \frac{2 \times 1000 \text{ m}}{3 \times 10^8 \text{ m/sec}} = 6.6 \text{ microseconds.}$$

The mirror begins sweeping the line image along the axis 30 at the time when reflections from the near end of the range interval R are to be expected.

With this arrangement of the receiver 22, a reflection from a point in the illuminated field of view 12 arrives at the image plane 24 at a time determined by the distance of its reflector from the receiver. Hence, a reflection from a point near the receiver is received before a second reflection from a point that is farther away. The first reflection impinges on the image plane at an earlier time and therefore in a different position in the direction of the axis 30 from the second reflection from the further point. That is, the first reflection is recorded when line 26 defined on the surface 24 by the lens 52 is nearer to the beginning of its sweep. Thus, as the scanner mirror 54 turns, it sweeps out on the surface 26 the contour of the reflectors in the illuminated field of view.

The image intensifier 32 amplifies the image resulting from receipt of radiation at various segments along the line 26 and movement of the line in the direction of the axis 30, and the image orthicon 34 stores this image as an electron image. Further, the orthicon scans this electron image to convert it to a sequential electrical signal. In response to this signal, the display unit 38 and tube 42 display the image by standard television camera beam sweep techniques. The display is a direct plot of range-axis (Z-axis) distance from the receiver as a function of the transverse X-axis position along the field of view.

The electrical signal produced with the image orthicon can in addition, or alternatively, be recorded on data processing equipment for subsequent processing and analysis. The recording can also be achieved photographically. As another alternative, the receiver 22 can include just the image intensifier 32 to produce an optical profile directly in response to received signals.

The optical detection and ranging equipment also includes a control and synchronizing unit 62 that synchronizes the operations of the source 10, receiver scanner 56, orthicon unit 30 and display unit 38. The unit 62 consists essentially of a source of a repetitive series timing pulses. In each series, the unit triggers the laser 16 to transmit an optical pulse, and synchronizes the scanner drive mechanism 60 to coordinate the mirror position and movement with the arrival time of the resultant reflections.

The motor 60 may be a synchronous motor rotating in synchronism with the pulses from the unit 62. A variable delay unit 64 between the unit 62 and the motor 60 permits adjustment of motor position with respect to the timing of the optical pulses from laser 16 and thereby provides for range adjustment. The speed of motor rotation, which affects the range interval, is then controlled by varying the repetition rate of the pulses from the unit 62.

Alternatively, one might use a stepping motor connected to index with each pulse from the synchronizing unit 62 and geared to rotate the mirror 54 once for each step of the motor. Range adjustment would then be accomplished by the delay unit 64 and range interval would be varied by adjusting the voltage of the indexing pulses applied to the motor 60.

The coordinated raster-like scans in the image orthicon tube 34 and the cathode ray tube 42 can be triggered to operate once for each pulse from the laser 16. However, since the image orthicon is a light-integrating and image storing device, it is preferable to scan it at a substantially slower speed. This increases the signal strength from the image orthicon and at the same time permits low-frequency (i.e. narrow bandwidth) operation of the electronic circuits associated with the image orthicon and cathode ray tubes.

In this connection, it should be noted that the scanning mirror 54 also acts as a shutter permitting incoming radiation to reach the image intensifier 32 only when the desired field of view is reflecting light from the laser 16. This largely prevents reception of extraneous energy between light pulses when multiple pulses are being recorded by the image orthicon tube 34.

If a photographic film is used instead of the image orthicon tube, it may be preferable, in some cases, to sweep the line 26 over the film by moving the latter rather than by deflecting the beam from the lens 52.

With further reference to the drawing, the laser 16 preferably produces optical energy of essentially a single wavelength, preferably less than 1 angstrom bandwidth, and of short duration, typically less than 30 nanoseconds and ideally as low as 5 nanoseconds. As noted above, a high pulse repetition rate capability is not required of the source 10. Accordingly, it can, for example, employ a Q-switched laser. Such a laser is capable of the high spectral purity and short pulse width desired for the laser 16. by contrast, lasers capable of high repetition rates, such as diode lasers, often have wider spectral bandwidths, i.e. on the order of 20 to 100 A° units. The narrow-band operation thus provided by the laser 16 permits employment of a narrow band spectral filter 46 with a significant reduction in solar background interference.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Optical detection and ranging apparatus comprising
  A. an optical source (10) arranged to illuminate an entire field of view simultaneously,
  B. means (22) arranged to
    (1) receive reflections of said optical energy from said field of view and
    (2) converge said reflections to a line extending along a first axis, with reflections received from different positions along a first direction in said field of view being positioned on said line at correspondingly different coordinates along said first axis,
  C. optical sensing means (32, 34) responsive to optical energy in said line, said optical sensing means
    (1) having an optically sensitive surface containing said first and second axes; and
    (2) storing an image of the reflections impinging thereon as a result of illumination by said optical source, said stored image providing an indication of the range and position of targets disposed within the field of view, and
  D. means (56) producing relative movement of said line and said sensing means along a second axis transverse to said axis, whereby reflections of source energy arriving at said receiver means at different times are sensed at correspondingly different coordinates along said second axis.

2. Apparatus according to claim 1 in which said source illuminates said field of view with a pulse of said energy.

3. Apparatus according to claim 1 in which said source includes
  A. a laser (16) operative to emit a pulse of optical energy and
  B. an optical system (18) in optical alignment with said laser energy and converting the laser output to a beam that illuminates said field of view.

4. Apparatus according to claim 1 in which said optical source includes a Q-switched laser.

5. Apparatus according to claim 1 in which said source is arranged to illuminate a substantially line field of view.

6. Apparatus according to claim 1 in which said movement-producing means includes optical deflecting means (54)
  A. in optical alignment with said converging means and
  B. arranged to displace said line formed by said converging means, and
  C. arranged for continuously increasing displacement of said line during reception of reflections from objects in a desired interval of ranges from said apparatus.

7. Apparatus according to claim 6 further comprising means (62) synchronizing said displacing operation of said deflecting means with said illumination of said field of view by said source.

8. Optical detecting and ranging apparatus comprising
  A. an optical source (10) arranged to transmit a pulse of substantially coherent radiation to an entire field of view elongated along a first axis,
  B. optical sensing means (32, 34) having an optically sensitive image surface (24) and producing an output manifestation responsive to optical energy impinging on said surface,
  C. an optical receiver (22) arranged to
    (1) receive reflections of said optical energy simultaneously from objects in said field of view which
      (a) have the same range from said apparatus, and
      (b) have different positions along said first axis, and
    (2) direct each reflection onto said optically sensitive surface with
      (a) a displacement along a second axis on said surface corresponding to the position along said first axis of said field of view from which the reflection stems, and
      (b) a displacement along a third axis on said surface corresponding to the relative time the reflection arrives at said receiver after said source produces the pulse resulting in the reflection.

9. Apparatus according to claim 8 in which said sensing means stores an image of the reflections impinging on said optically sensitive surface.

10. Apparatus according to claim 8 in which said receiver includes optical deflecting means
   A. producing said displacement along said third axis, and
   B. comprising
      (1) mechanical drive means (60) and
      (2) a mechanically-operated optical deflector (54) arranged for movement in a scanning motion by said drive means each time said source emits a pulse of said radiation.

11. Apparatus according to claim 10 in which said optical deflector (54) is arranged either as a Dove prism or as a mirror.

12. Apparatus according to claim 9 in which said sensing means produces a succession of electrical signals corresponding to said image formed on said surface.

13. Apparatus according to claim 9 in which said sensing means comprises
   A. an optical converter (32) arranged to intensify optical energy directed onto said sensitive surface,
   B. an image orthicon device (34) arranged to convert said intensified energy from said converter to a succession of electrical signals, and
   C. signal processing means (38, 42) arranged at least to store and display said signals from said image orthicon device.

14. Optical detection and ranging apparatus comprising
   A. an optical source (10) arranged to illuminate with a pulse of substantially monochromatic, coherent radiation a narrow field of view elongated along a first axis transverse to the range axis of said apparatus,
   B. optical sensing means (32, 34)
      (1) having an optically sensitive surface (24) and
      (2) storing an image of radiation impinging on said surface,
   C. focusing and aperture means (49, 50a) for restricting the radiation impinging on said surface to radiation from said field of view,
   D. a narrow band filter (46) arranged to restrict the radiation impinging on said surface to radiation having essentially the wavelength of said source,
   E. means (52) converging the radiation impinging on said source to a line (26) parallel to a second axis (28) on said surface, whereby the coordinate along said second axis of radiant energy in said line corresponds to the coordinate along said first axis of the object in said field of view providing said energy,
   p1 F. optical deviation means (56) arranged to sweep said line along a third axis (30) on said optically sensitive surface transverse to said second axis, whereby the coordinate along said third axis of energy impinging on said surface corresponds to the range of the object in said field of view whose radiation provides such energy.

15. The combination defined in claim 14 including means (62) for synchronizing the operation of said deviation means with the transmission of pulses by said optical source.

16. The combination defined in claim 15 including means (64) for varying the relative timing of transmission of pulses by said optical means and sweeping of said line by said deviating means.

17. The combination defined in claim 14 in which said sensing means includes means (34) for electronically scanning said image with a raster-like scan and thereby providing a sequence of electrical signals corresponding to said image.

18. The combination defined in claim 17 including a cathode ray tube connected to reproduce said image in response to said electric signals.

19. The combination defined in claim 14 in which said deviation means is
   A. disposed in the path of radiation impinging on said surface, and
   B. arranged to sweep said line by deflecting said impinging radiation.

* * * * *